(12) United States Patent
DeZaio

(10) Patent No.: US 9,739,055 B2
(45) Date of Patent: *Aug. 22, 2017

(54) TEMPORARY, NON-LOAD BEARING WALL ASSEMBLY

(71) Applicant: DeZaio Productions, Inc., Fair Lawn, NJ (US)

(72) Inventor: Michael DeZaio, Ridgewood, NJ (US)

(73) Assignee: DeZaio Products, Inc., Fair Lawn, NJ (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/558,157

(22) Filed: Dec. 2, 2014

(65) Prior Publication Data

US 2015/0082726 A1    Mar. 26, 2015

Related U.S. Application Data

(63) Continuation of application No. 13/528,495, filed on Jun. 20, 2012, now Pat. No. 8,904,728, which is a continuation of application No. 12/709,558, filed on Feb. 22, 2010, now Pat. No. 8,209,917.

(60) Provisional application No. 61/178,216, filed on May 14, 2009.

(51) Int. Cl.
*E04B 2/72* (2006.01)
*E04B 2/74* (2006.01)
*F16B 7/04* (2006.01)
*E04C 2/38* (2006.01)
*E04B 1/41* (2006.01)

(52) U.S. Cl.
CPC .............. *E04B 2/7407* (2013.01); *E04B 1/40* (2013.01); *E04B 2/721* (2013.01); *E04C 2/384* (2013.01); *F16B 7/0433* (2013.01)

(58) Field of Classification Search
CPC ...... E04B 2/7425; E04B 2/7407; E04B 2/721; E04B 2/7809; E04B 2/7827; E04B 2002/7464; E04B 2002/7462; E04B 2002/7487; E04B 2002/7485; F16B 7/0433; F16B 7/187; F16B 12/02; F16B 37/045; Y10T 403/4677
See application file for complete search history.

(56) References Cited

U.S. PATENT DOCUMENTS 4,485,597 A * 12/1984 Worrallo ............... F16B 7/0473
                                          403/255
4,490,064 A * 12/1984 Ducharme ......... A47B 47/0008
                                          403/252
5,232,254 A *  8/1993 Teaff ..................... E05C 19/003
                                          292/259 R (Continued)

FOREIGN PATENT DOCUMENTS

DE         29706302 U1 *  6/1997  ........... E04B 2/7455

*Primary Examiner* — Ryan Kwiecinski
(74) *Attorney, Agent, or Firm* — Hoffmann & Baron, LLP

(57) ABSTRACT

A temporary, non-load bearing wall panel that when joined together with other one or more like panels, is used as a barrier (also known as a barricade wall) that keeps a construction area, vacant store, or any other undesirable element out of the reach and view of pedestrians. If required by the end user, the panels could be laminated with a visual graphic for reasons of aesthetic enhancement, advertisement of service, announcement of future business expectations, etc. A door and/or window display, dust curtains, etc. may be added to the panels as dictated by the end user.

24 Claims, 11 Drawing Sheets

(56) References Cited

U.S. PATENT DOCUMENTS

| | | | | |
|---|---|---|---|---|
| 5,634,300 A * | 6/1997 | Huebner | E04B 2/7407 | 52/281 |
| 5,864,997 A * | 2/1999 | Kelly | A01G 9/14 | 403/294 |
| 6,415,557 B1 * | 7/2002 | McCalley | E04B 1/08 | 109/1 S |
| 6,415,558 B1 * | 7/2002 | Cherry | E04H 9/14 | 292/138 |
| 6,446,413 B1 * | 9/2002 | Gruber | A47G 27/0237 | 52/127.7 |
| 6,493,995 B2 * | 12/2002 | McKenzie | A47F 5/105 | 52/220.7 |
| 6,799,404 B2 * | 10/2004 | Spransy | E04B 9/02 | 160/87 |
| 7,226,093 B1 * | 6/2007 | Stailey | E05C 19/003 | 292/259 R |
| 7,293,935 B2 * | 11/2007 | Band | F16B 7/187 | 403/254 |
| 7,389,621 B2 * | 6/2008 | Hawes | E04C 3/005 | 52/647 |
| 7,690,159 B1 * | 4/2010 | Arnold | A01K 1/0035 | 108/35 |
| 8,100,600 B2 * | 1/2012 | Blum | F16B 37/045 | 403/256 |
| 8,209,917 B1 * | 7/2012 | DeZaio | E04C 2/384 | 52/285.3 |
| 8,776,453 B1 * | 7/2014 | Fain | E04H 9/14 | 109/1 S |
| 2004/0165942 A1 * | 8/2004 | Schmid | E04B 1/2604 | 403/231 |
| 2006/0110215 A1 * | 5/2006 | Holscher | F16B 7/187 | 403/253 |
| 2007/0158957 A1 * | 7/2007 | Kramer | E05C 19/003 | 292/259 R |
| 2007/0234651 A1 * | 10/2007 | Gage | E04B 1/02 | 52/173.2 |
| 2008/0030029 A1 * | 2/2008 | McGinnis | E05C 7/04 | 292/259 R |
| 2009/0013607 A1 * | 1/2009 | Whitaker | E05C 19/003 | 49/501 |
| 2012/0073215 A1 * | 3/2012 | Zhang | E04B 1/34321 | 52/79.9 |
| 2013/0180197 A1 * | 7/2013 | Gompper | E04F 13/0801 | 52/586.1 |
| 2015/0191949 A1 * | 7/2015 | Wilson | E05C 19/003 | 292/259 R |

* cited by examiner

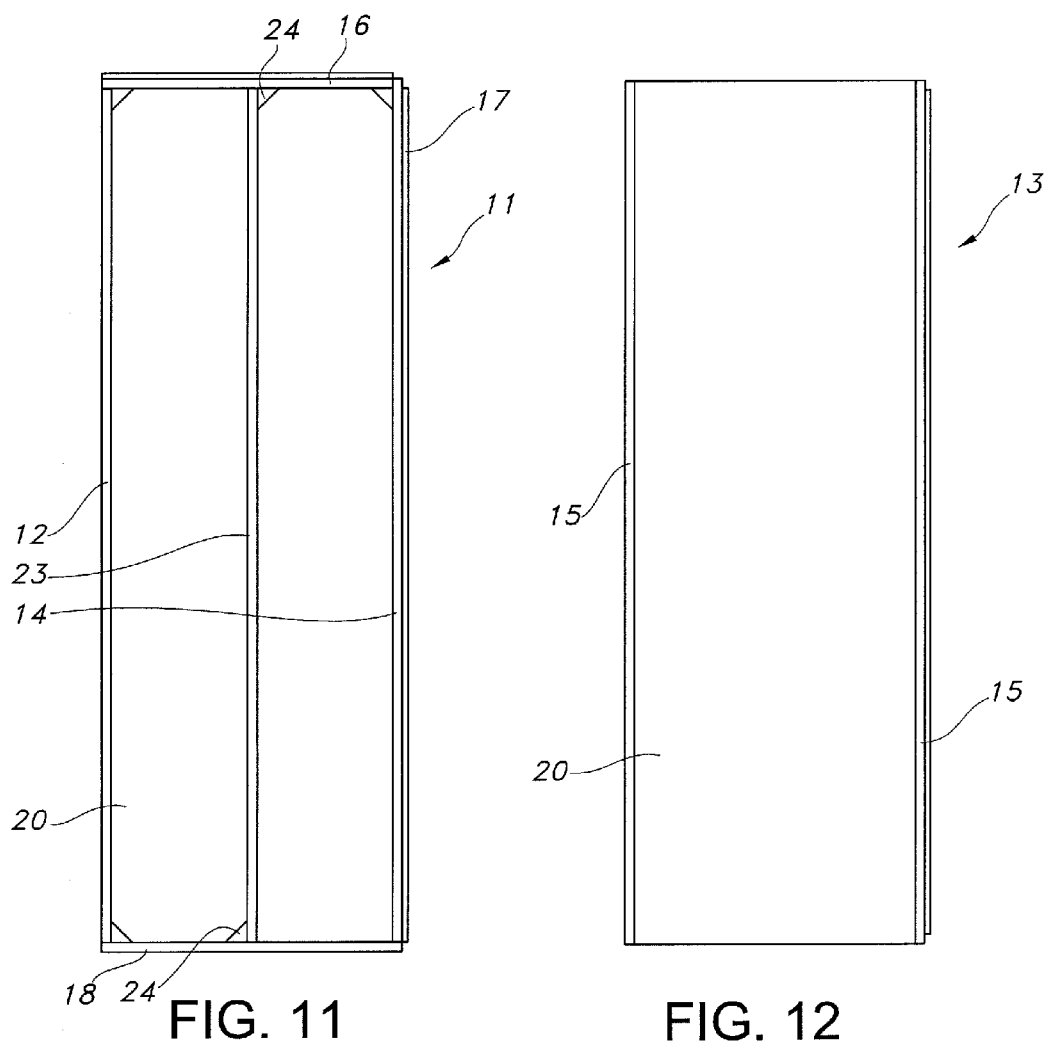

TEMPORARY, NON-LOAD BEARING WALL ASSEMBLY

CROSS REFERENCE TO RELATED APPLICATIONS

This application is a continuation of U.S. patent application Ser. No. 13/528,495 filed on Jun. 20, 2012, which is a continuation of U.S. patent application Ser. No. 12/709,558 filed on Feb. 22, 2010, which claims priority to and benefit of U.S. Provisional Patent Application No. 61/178,216 filed on May 14, 2009, all of which are incorporated herein by reference in their entireties.

BACKGROUND

Field

The present invention relates to a barrier wall system, and more specifically, to a non-load bearing wall panel that when joined together with other panels is used as a barrier.

Brief Discussion of Related Art

A temporary, non-load bearing wall panel that when joined together with other like panels, is used as a barrier (also known as a barricade wall) that keeps a construction area, vacant store, or any other undesirable element out of the reach and view of pedestrians.

Partition systems are often employed to separate portions of a building or room. Partitions serve as a barrier to unsightly construction, noise, light and the like. In construction zones, partitions are also useful for protecting a clean area from a work area.

Workers at construction sites often use rudimentary techniques for installing partitions. Some simply nail, screw, or staple a curtain or partition material to the floor, ceiling, and abutting walls, resulting in damage to their surfaces. Others tape or otherwise adhere a curtain or plastic sheet to the walls and ceilings. The tape usually fails to stick, but if it does stick, as the tape is removed, paint usually pulls off with the tape or adhesive is left behind.

There is a need for an easy to install barrier in-situ that provides flexibility to be adapted to various space requirements and customer's purposes. There is a need for a dust-free panel system that effectively provides dust protection across the panel system. There is a need for panels that could be laminated with a visual graphic for reasons of aesthetic enhancement, advertisement of service, announcement of future business expectations, with seamless connections without frames and interruptions in the visual image surface. There is a need for a door and/or window display, dust curtains, etc., that may be added to the panels as dictated by the end user. There is a need to have environmentally friendly barriers that can be reused continually and then be able to be totally recycled at the end of expected life term, thereby greatly reducing landfill waste.

SUMMARY

A temporary, non-load bearing wall panel that when joined together with other like panels, is used as a barrier (also known as a barricade wall) that keeps a construction area, vacant store, or any other undesirable element out of the reach and view of pedestrians. If required by the end user, the panels could be laminated with a visual graphic for reasons of aesthetic enhancement, advertisement of service, announcement of future business expectations, etc. A door and/or window display, dust curtains, etc., may be added to the panels as dictated by the end user.

One aspect is a non-loading bearing panel and connection system including at least two panels, an aluminum frame, a connector, and a quick connect clasp assembly. Each of the at least two panels includes two vertical sides, two horizontal sides, and a planar panel extending therebetween. The planar panel has a front surface and a back surface. The aluminum frame is attached to the back surface of the at least two panels, and the aluminum frame extends adjacent the perimeter of the two vertical sides defining vertical frames. The connector is attached to the aluminum frame along one of the two vertical sides. The quick connect clasp assembly removably joins together two adjacent vertical frames from the opposing at least two panels. The at least two panels are connected together defining a panel joint, and the connector extends between the panel joint preventing dust from flowing through the panel joint.

Additional aspects include each of the at least two panels provides a frameless front surface, the panels are formed from recyclable raw materials, i.e. a co-polymer sheet, the panels are flame retardant, and/or at least one of the at least two panels can be flexible and the two vertical sides bend at an angle up to about 270° defining a corner panel. Further, at least one of the at least two panels can further include the aluminum frame attached to the back surface of the at least two panels, and the aluminum frame extends adjacent the perimeter of the two horizontal sides defining horizontal frames. At least one of the at least two panels can further include the aluminum frame attached to the back surface of the at least two panels extending between the vertical frames or the horizontal frames providing support along the length of the panels.

As above-mentioned, a vinyl graphic can be applied to the front surface of each panel, wherein the graphic is seamless between the panel joints. The system can further include a door attached to one of the at least two panels, and the door is flush mounted to the front surface of at least one of the at least two panels.

Additionally, the system can further include a wall shop attached to the vertical frames of adjacent panels. The wall shop is an inset box-like structure including a bottom wall, a top wall, a back wall, two opposed sidewalls and a front planar panel. The back wall and the two opposed sidewalls extend between the top wall and the bottom wall. The front planar panel defines an open front to access an interior to the wall shop and the front planar panel is flush with the front surface of the at least two panels. The front planar panel is attached to the vertical frames of the at least two panels.

Furthermore, the connector can be directly attached to one of the two vertical sides and the aluminum frame is slidably attached to the connector. The connector includes a male coupling member and a female coupling member, and the female coupling member and the male coupling member of opposing panels are mateable therewith to prevent dust from flowing through the panel joint and to assist with alignment of the panels. The connector can include a tail, a head and a middle attachment section extending between the tail and the head. The aluminum frame is slidably attached to the head, and the tail includes a longer portion defining the male coupling member and a shorter portion. The longer portion protrudes from the perimeter of one of the two vertical sides, and another of the two vertical sides is arranged having the shorter portion inset from another of said two vertical sides and inset from the aluminum frame defining the female coupling member. Additionally, the tail can be attached to the back surface of the panel. Further, the connector can be directly attached to the back surface of the panel, the connector includes a head and a middle portion attached to the head, and the aluminum frame slidably attaches to the head of the connector.

Additionally, the quick connect clasp assembly is a U-shaped plate having a planar plate and two end plates perpendicular to the plate. The end plates are connected to the planar plate by materials continuity, an L-shaped plate extends from the planar plate perpendicularly therefrom, and the L-shaped plate extends a portion of an edge of the planar plate. The locking portion is attached to the planar plate, and the locking portion includes a joining member attached to the planar plate, a back portion pivotally connected to the joining member, an elongated curved portion pivotally connected to the back portion. The elongated curved portion extends beyond the planar plate to attach to one of the aluminum frames, pivoting the back portion away from the elongated curved portion locks the quick connect clasp assembly to the aluminum frame.

Further aspects are each of the end plates includes a pair of openings therethrough for attachment of the panel to a perpendicular surface; the planar plate includes a pair of elongated openings perpendicular to the locking portion; a fastener extends through the opening and a locking member secures the fastener to the planar plates; and the quick connect clasp assembly is removably attached to the aluminum frames and slidable along the aluminum frame.

BRIEF DESCRIPTION OF THE DRAWINGS

For a further understanding of the above objects and advantages, reference is made to the following detailed description and to the drawings, in which:

FIG. 11 is a back plan view showing a partial panel assembly including a vertical support of the present invention;

FIG. 12 is a back plan view showing a corner panel assembly absent horizontal supports of the present invention;

DETAILED DESCRIPTION

The invention is shown in FIGS. 1-24 and described herein. Unlike other types of barricades that are made of non-recyclable material such as, sheet rock (gypsum board), wood, thermally laminated pressed board, etc., this unique wall panel is constructed of a highly fire retardant, recycled co-polymer sheet that is attached to a rigid recycled aluminum frame by the use of cement/adhesive, all 100% recyclable. Since the co-polymer sheet could be separated from the aluminum frame, the entire wall panel could be easily recycled if the panel is ever damaged beyond reasonable repair. Additionally, the wall panel provides for easy maintenance because it never has to be painted and requires only soap and water to clean. Further, 90.9% of a typical 4'×12' frame is welded for high strength.

Figure 1:
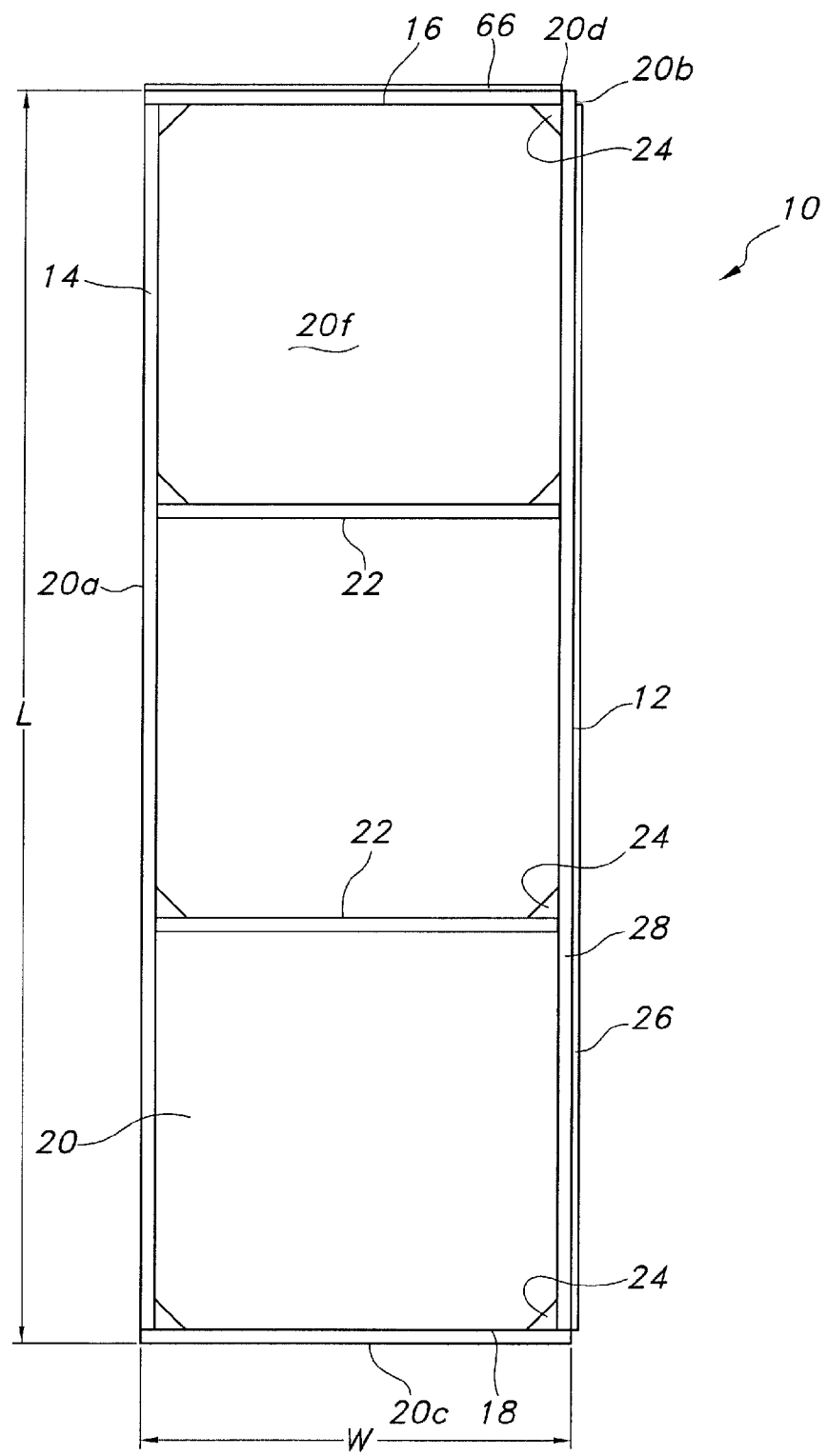
FIG. 1 is a back plan view showing a partial panel assembly including horizontal supports of the present invention.

FIG. 1 shows the panel assembly 10 of the present invention. FIG. 1 shows the panel assembly 10 is generally rectangular in shape but other configurations are contemplated. Panel assembly 10 includes a frame structure 28 and a panel 20 attached thereto. A frame structure 28 is defined by a pair of vertically extending side frames 12, 14, and a pair of horizontally extending side frames 16, 18 and horizontal cross members 22 extending between the side frames 12, 14. The frame structure 28 is formed from aluminum to provide strength and light weight. The horizontally extending side frames include a top frame 16 and a bottom frame 18. The horizontal cross members 22 extend between the vertically extending side frames 12, 14 and top frame 16 and bottom frame 18 to provide structural support to the panel 20.

The bottom frame 18 extends along the bottom of the panel assembly 10 such that the width (W) of the panel assembly 10 is the same as the length of the bottom frame 18. Side frames 12, 14 rest on top of and attach to the bottom frame 18 such that the external surface of side frames 12, 14 do not exceed the perimeter of the bottom frame 18, as shown in FIG. 1. The side frame 12 extends from the bottom frame 18 to the top frame 16. The internal side surface of the side frame 12 abuts the end of the top frame 16, lapping the joint, and is attached to the top frame 16 such that the top frame 16 does not add to the length (L) of the panel assembly 10. The side frame 14 abuts the bottom surface of the top frame 16 and the top surface of the bottom frame 18, as shown in FIG. 1. FIG. 1 also shows side frame 12 is longer than side frame 14 by the thickness of top frame 16. Bottom frame 18 is longer than the top frame 16 by the width of side frame 14.

Figure 8:
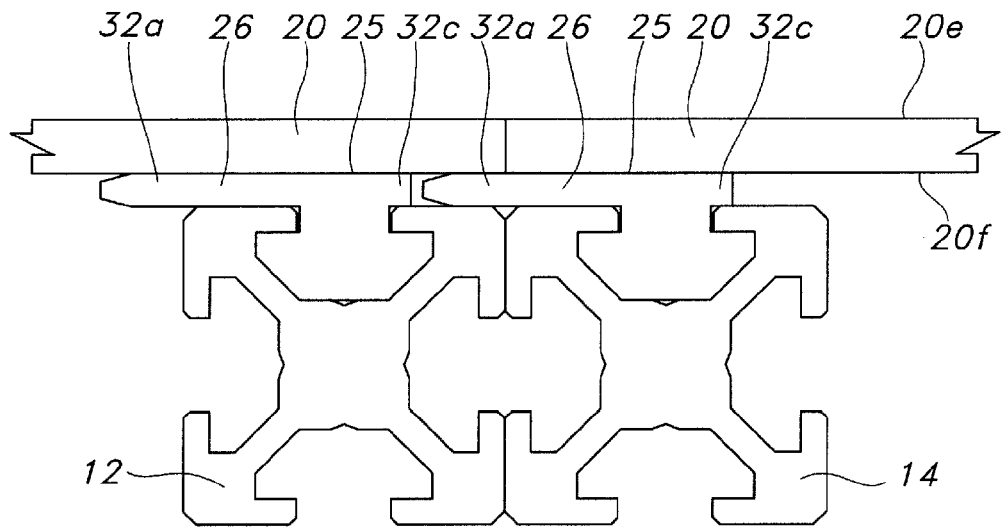
FIG. 8 is a cross sectional view of the panel assembly of the present invention.

The cross members 22 are connected to the vertically extending side frames 12, 14 by welding forged aluminum gussets to the corner where the cross member 22 extends perpendicularly from the vertically extending side frames 12, 14. Additionally, gussets 24 are used in the four corners that connect each vertically extending side frame 12, 14 to each of the horizontally extending frame 16, 18. Panel 20 is a planar sheet attached to the frame structure 28. FIGS. 1 and 8 show panel 20 includes two vertical sides (20a, 20b), two horizontal sides (20c, 20d), a front surface (20e) and a back surface (20f. Panel 20 is constructed of a highly fire retardant, recycled co-polymer sheet. The recycled co-polymer is specially formulated with fire and smoke inhibitors that allow the extruded panel to meet ASTM E84, Class 1, standards that are the highest classification for Surface Burning Characteristics of Building Materials. Panel 20 has a smooth surface on one side and a hair-cell textured finished on the other side. The smooth surface finish insures proper surface binding with the first connector 26 or with the frame 28 and the hair-cell textured surface resists soiling and provides easy removal of vinyl graphic applications. Sandwiched between the panel 20 and the vertically extending frame 12 is a first connector member 26 which protrudes from the profile of the frame structure 28.

Figure 9:
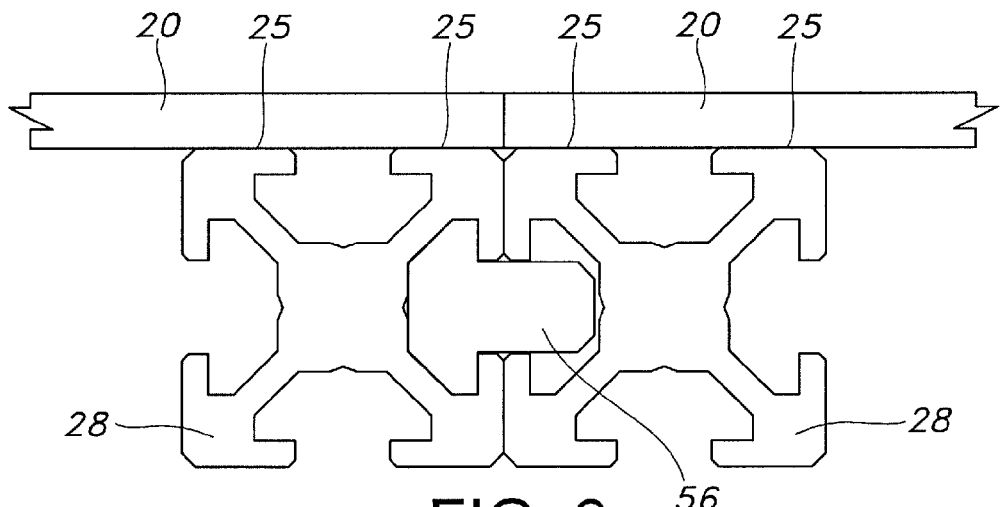
FIG. 9 is a cross sectional view of the panel assembly of the present invention.
Figure 13:
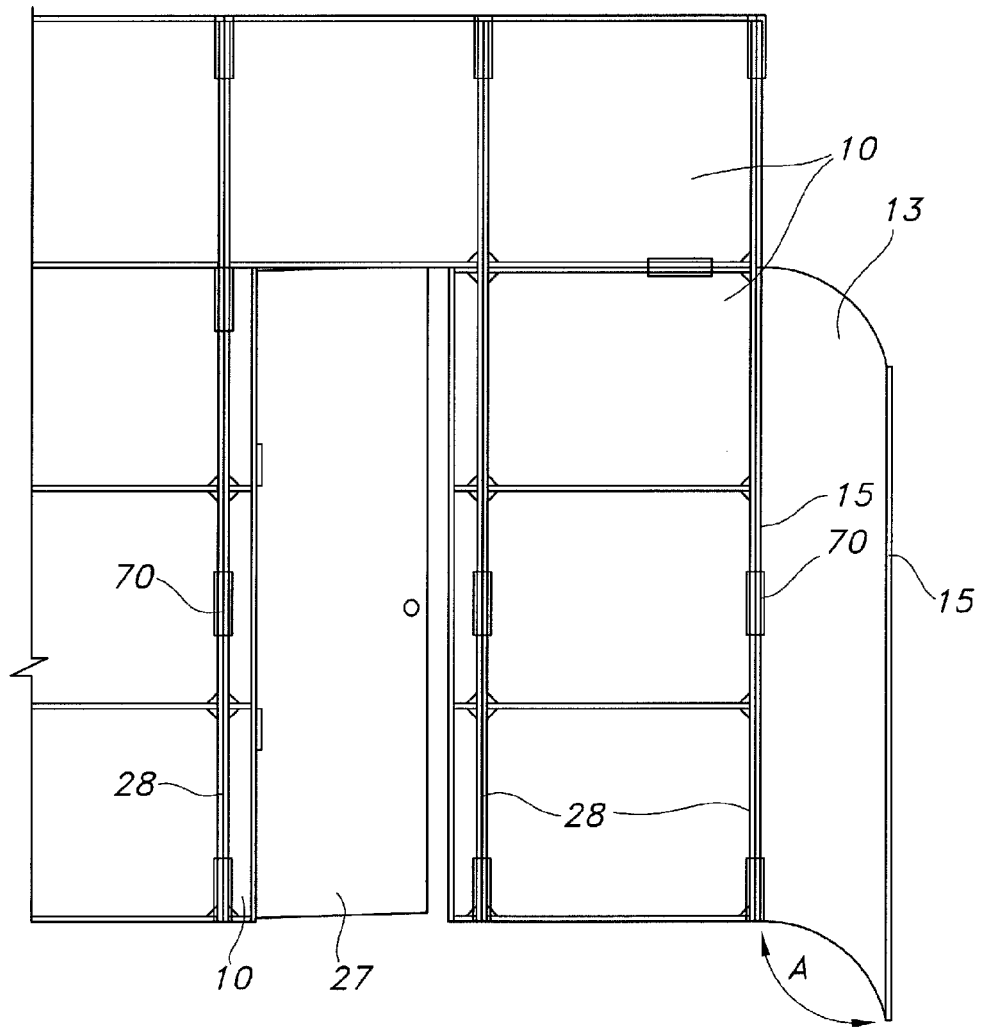
FIG. 13 is a back plan view of various panel assemblies attached together.

The first connector member 26 is attached to the edge of the panel 20 by an adhesive material to mechanically bond the first connector member 26 to the panel 20 such as glue, cement, tape and the like. The adhesive material 25 shown in FIGS. 8 and 9 is a special industrial strength, high tack, and double-sided foam core tape. The first connector member 26 provides the appearance of no seams, seamlessly securing two panel assemblies 10 together. A first connector member 26 may also be applied to the top frame 16 of the panel assembly 10 to allow for stacking of panel assemblies 10 in the vertical direction, as shown in FIG. 1. The panel assemblies 10 can be stacked at greater heights than other systems due to the design of the panel assembly 10 and the inherent strength of the materials, as shown in FIG. 13. When the wall panel assemblies 10 are joined side by side or extended at the top, the joints of the panel 20 are barely visible creating an almost seamless wall. The panels 20 are almost seamless when joined together as shown in FIGS. 8 and 9, so there are no noticeable surface imperfections when a vinyl graphic is applied to the front surface 20e of panels 20 in FIG. 8.

Figure 2:
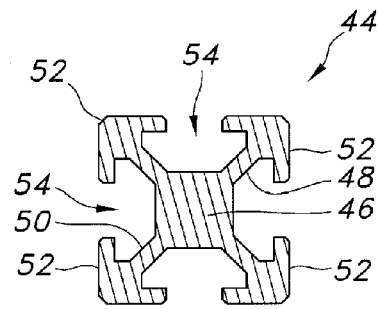
FIG. 2 is a cross sectional view of the support frame of the present invention.
Figure 3:
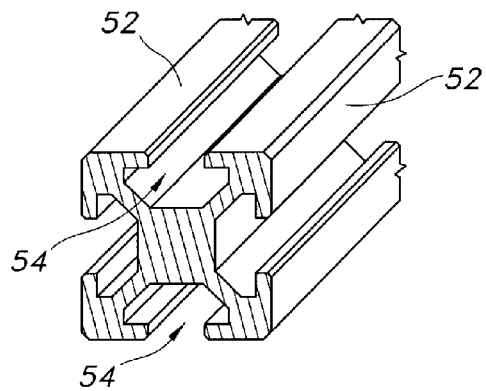
FIG. 3 is a perspective view of the support frame of FIG. 2.

FIGS. 2 and 3 show a cross sectional view of the individual frame components 44 which form the frame structure 28, as shown in FIG. 1. The individual frame components 44 are formed from an extruded aluminum and have an X-shaped profile. The individual frame components 44 include a center core 46 which is square in-shape and arrow portions 48 extending from each corner of the center core 46. The arrow portion 48 includes a base 50 extending from the center core 46 to an arrow head portion 52. The surfaces of the center core 46, base 50 and internal surface of the arrow head portion 52 creates a frame channel 54 for receiving the first connector member 26, as in FIGS. 6 and 7.

Figure 4:
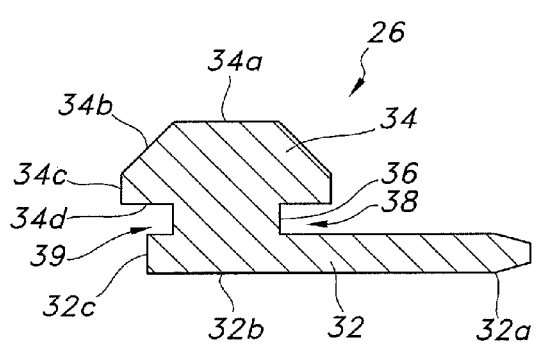
FIG. 4 is a cross sectional view of the connector member of the present invention.
Figure 5:
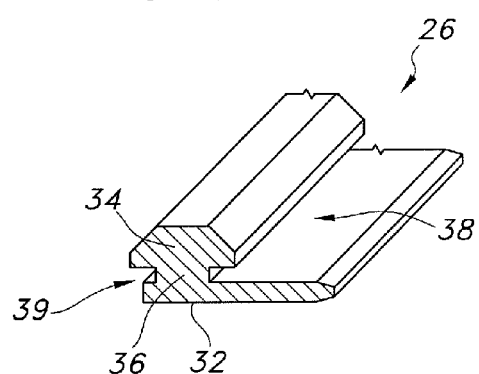
FIG. 5 is a perspective view of the connector member of FIG. 4.
Figure 6:
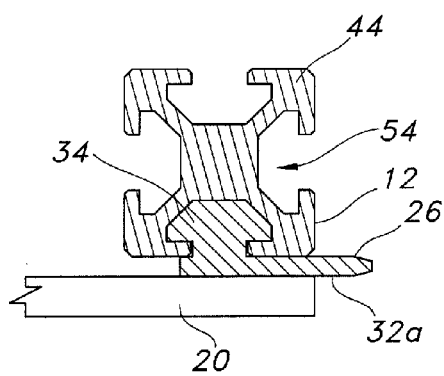
FIGS. 6 and 7 are cross sectional views of a partial panel assembly of the present invention.
Figure 7:
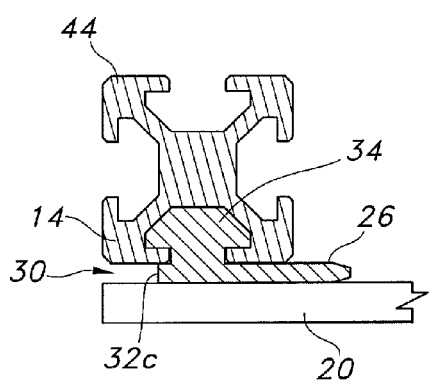
Figure 10:
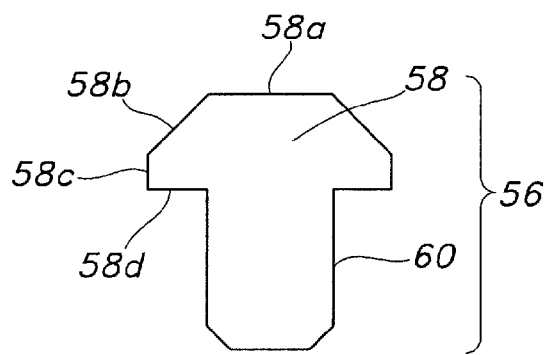
FIG. 10 is a cross sectional view of the connector member of the present invention.
Figure 18:
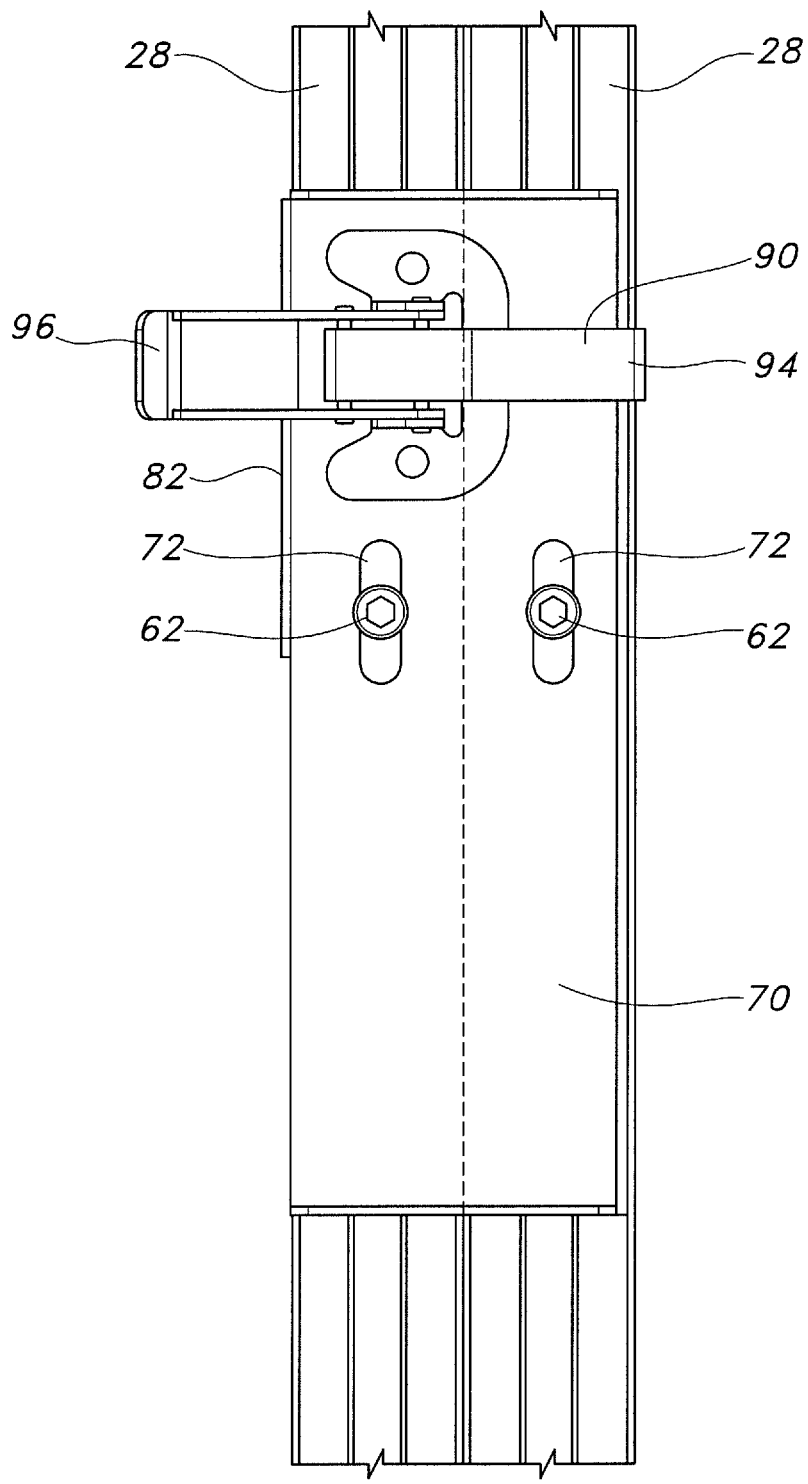

A first connector member 26 or a second connector member 56, as shown in FIGS. 4 and 10 respectively, is used in conjunction with the frame structure 28 and a quick-connect member 70 of FIG. 18 to attach two panel assemblies 10 together. There are two types of connector members. FIGS. 4 and 5 show the first connector member 26 which includes a tail 32. FIGS. 9 and 10 show a second connector member 56 absent a tail. The first connector member 26 is an elongated connector co-polymer profile made from 100% recycled material that slides into the aluminum frame slot, or channel 30 and protrudes beyond the frame 28 of which it is attached to, as shown in FIGS. 6-8. FIGS. 4 and 5 show the first connector member 26 is an extended plastic member including a tail 32, a head 34 and a middle attachment section 36 attaching the head 34 to the tail 32.

The head 34 includes a flat top portion 34a with angled sides 34b extending therefrom. The angled sides 34b extend between the top portion 34a and a vertical side 34c. The vertical side 34c extends between the angled sides 34b and an inwardly horizontal lip section 34d. The horizontal lip section 34d is perpendicularly attached to the middle attachment member 36. The tail 32 is a generally planar and is slightly offset from the attachment point 32b to the middle attachment member 36, such that the tail 32 extends on either side from the middle attachment 36 but the tail 32 extends longer on one side than the other side. The tail 32 includes a longer portion 32a, attachment point 32b and a shorter portion 32c. The horizontal lip 34d, middle attachment 36 and the tail 32 define channels 38, 39 for accepting the frame member therein.

FIGS. 6 and 7 show the cross sectional view of the vertically extending side frame 12, 14 attached to the first connector member 26. A first connector member 26 is sandwiched between each vertically extending side frame 12, 14 and the panel 20. The head 34 of the first connector member 26 seats within the frame channel 54 of the frame to attach the vertically extending side frame 12, 14 to the first connector member 26 and the panel 20. FIG. 6 shows the first connector member 26 attached to the side frame 12 and the panel 20. The first connector member 26 is engaged with the side frame 12 such that the longer tail 32a extends beyond the perimeter of the panel 20. FIG. 7 shows the first connector member 26 is attached to the side frame 14 such that the shorter tail 32c extends towards the edge of the panel 20 but does not exceed the perimeter of the panel 20. FIG. 7 shows a side channel 30 is defined by the space between the panel 20, shorter tail 32c and the frame 14. The side channel 30 accommodates the protruding profile of the longer tail 32a from an adjacent adjoining panel assembly 10 which is connected to the panel assembly, as shown in FIG. 8. The side channel 30 provides a connection guide and the longer tail 32a provides a dust shield when two or more panels are connected side by side, or top to bottom.

FIG. 8 shows the first connector member 26 directly connected to the panel 20. FIG. 9 shows the second connector member 56 is slidably attached directly to two individual aluminum frames 28 from different assembly panels 10. FIG. 10 shows the cross sectional view of the second connector member 56 which is similar to first connector member 26 of FIGS. 4 and 5 but without the tail 32. The second connector member 56 includes a head 58 attached to a shaft, or middle portion 60. The head 58 is similar to the head 34 of first connector member 26, and the middle portion 60 is similar to the middle attachment section 36 of first connector member 26.

Specifically, the head 58 includes a flat top portion 58a with angled sides 58b extending therefrom. The angled sides 58b extend between the top portion 58a and a vertical side 58c. The vertical side 58c extends between the angled sides 58b and an inwardly horizontal lip section 58d. The horizontal lip section 58d is perpendicularly attached to the middle portion 60. The middle portion 60 extends perpendicularly from the horizontal lip section 58d. The first connector member 26 and the second connector member 56 provide a dust barrier between the connected panel assemblies 10.

FIG. 11 shows a panel assembly 11 which is similar to panel assembly 10 of FIG. 1 including a frame structure 17 and a planar panel 20. The frame structure 17 includes top frame 16, bottom frame 18 and side frame 12 and 14. Panel assembly 11 includes vertical cross member 23 which extend between the top frame 16 and the bottom frame 18. The vertical cross member 23 is attached to the top and bottom frames 16, 18 by welding a gusset 24 to the perpendicular connection corners between the vertical cross member 23 and the top and bottom sides 16, 18. While FIG. 11 shows one vertical cross member 23, it is contemplated that a plurality of vertical cross members may be included. The frames 16, 18 and vertical cross member 23 are made from the same frame component 44 as shown in FIGS. 2 and 3.

FIG. 12 shows a corner panel assembly 13 which is similar to the panel assembly 10 of FIG. 1 including a pair of vertically extending sides 15 and a planar panel 20. Panel assembly 13 is absent horizontal frames and cross members to allow the panel 20 to flex and bend providing curved corners, as shown in FIG. 13. The corner panel assembly 13 exhibits flexural capabilities, such that the panel will be able to bend at an angle (A) up to 270 degrees, as shown in FIG. 13.

Figure 14:
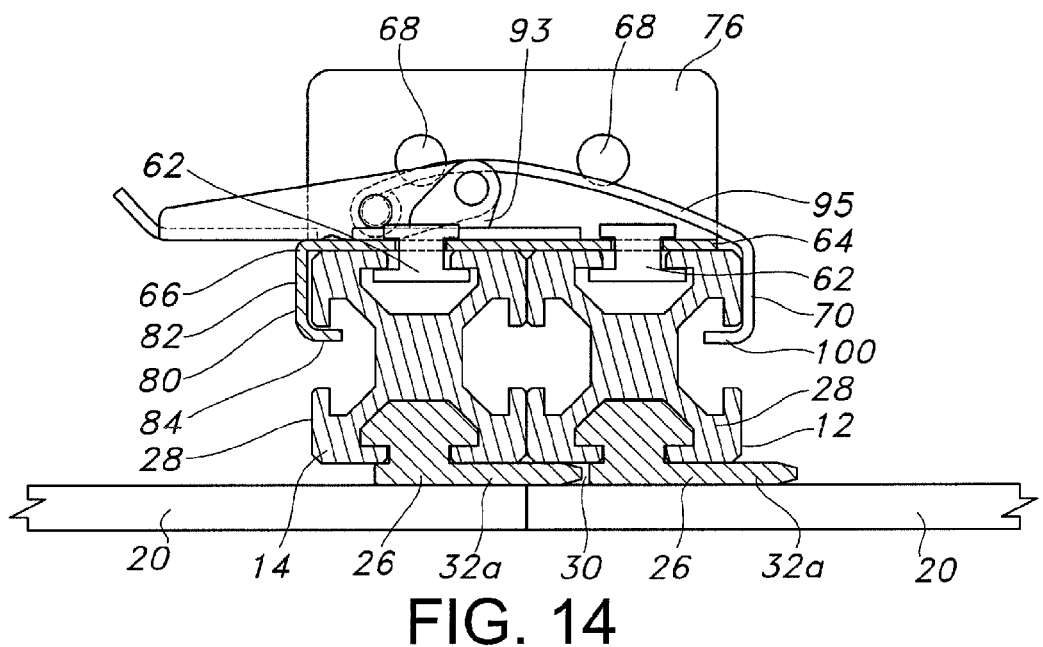
FIG. 14 is a cross sectional view of the quick-connect of the present invention.

FIGS. 13-15 and 18 show two or more wall panel assemblies 10 and corner panel assembly 13 are removably secured together by use of a specialized quick-connect spring loaded clasp and plate assembly or quick-connect 70. The quick-connect 70 straddles two adjoining wall panel frames 28 on the back side of the panel assemblies 10 where the two wall panel assemblies come together. Once in place, one or two bolts 62 are placed through slots 72 in the quick-connect plate 70 and into the framing, as shown in FIG. 14. Once tightened, the bolts 62 ensure a positive, secure connection. The quick-connect 70 also doubles as an attachment point for either top or bottom (or both) anchoring the panel assembly 10 to the floor or other structure. FIG. 13 also shows a door 27 flush mounted to one of the panel assemblies 10.

FIGS. 14-17 show the quick-connect 70 of the present invention. The quick-connect 70 includes a plate 74 and a clamp mechanism 90. The plate 74 is rectangular in-shape with two ends 76 on either side of a center portion 78. Each of the two ends 76 is bent upwardly, perpendicular to a center portion 78. The plate 74 has a U-shaped side profile with one side edge 64 being an unattached end and the other side edge 66 having an L-shaped extension member 80 extending from a portion of the other side edge 66. The L-shaped extension member 80 extends downwardly from the center portion 78 in the opposing direction of the two ends 76. The L-shaped extension 80 includes a longer leg 82 and a shorter leg 84.

The longer leg 82 is perpendicularly extending from the center portion 78. The shorter leg 84 extends from the other end of the longer leg 82, and parallel to the center portion 78. FIG. 14 shows the L-shaped extension member 80 in combination with the center portion 78 provide securement of the quick-connect 70 about one of the frame structures 28, i.e. vertical side 14. The plate 74 includes a plurality of elongated slots 72 and holes 68. The elongated slots 72 are used in combination with t-bolts 62 to secure the quick-connect 70 to the frame structure 28. Bolts, screws or other anchoring hardware are placed through holes 68 to attach the panel assembly 10 to a floor or other external structure. The bottom surface of plate 74 is in contact with the support structure. The top surface of plate 74 includes a clamp mechanism 90 attached thereto.

The clamp mechanism 90 includes a base plate 92, a hook 94 and a lever 96 as shown in FIGS. 15-18. The base plate 92 is a flat, planar plate having a U-shaped design. The base plate 92 is attached to the plate 74 by mechanical attachment such as welding. The base plate 92 has a pair of extensions 93 which extend perpendicularly from the base plate 92. Each extension 93 includes an aperture 91 for acceptance of a rod 86 therethrough. The lever 96 is seated between the pair of extensions 93. The lever 96 is attached to the base plate 92 by the rod 86 which extends through the apertures 91 of the extensions 93 and though holes (not shown) in the lever 96. The lever 96 pivots on the rod 86. The lever 96 includes a pair of sidewalls 97 attached on opposing edges of a bottom wall 98, and an angled front wall 99 extending from an edge of the bottom wall 98. The front wall 99 is used by the operator to pivot the lever 96 into and out of a locking position. Hook 94 is pivotally attached to the lever 96. Bar 88 extends through apertures in the lever 96 and one end of hook 94 is wrapped about the bar 88 such that the hook 94 pivotally rotates about the bar 88. Hook 94 is a curved strip 95 of metal with an L-shaped attachment 100 at one end for securement to a frame structure 28, i.e. vertical side 12 as shown in FIG. 14.

Figure 15:
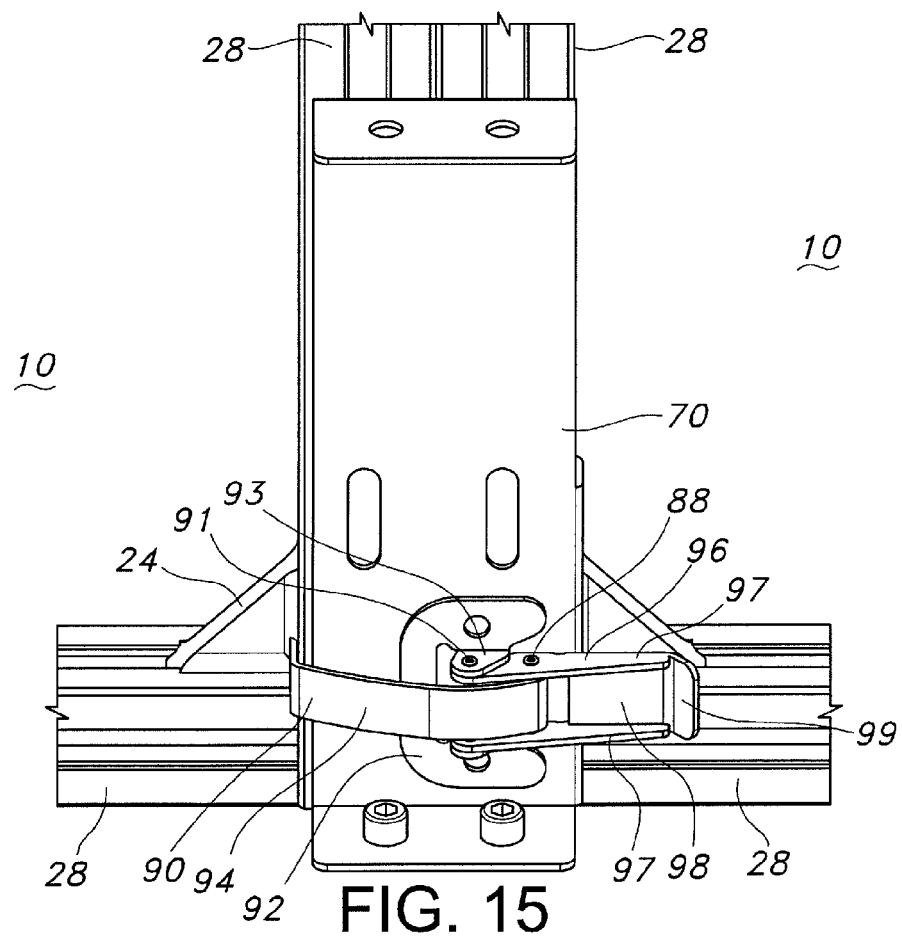
FIGS. 15 and 16 are perspective views of the quick-connect of FIG. 14.
Figure 16:
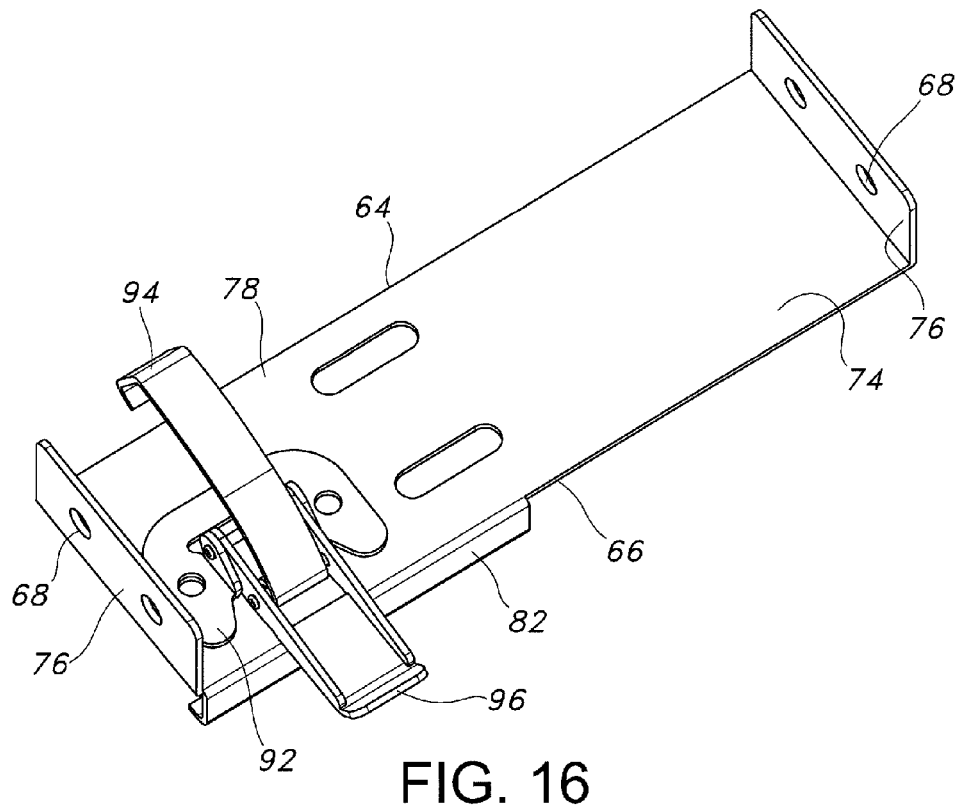
Figure 17:
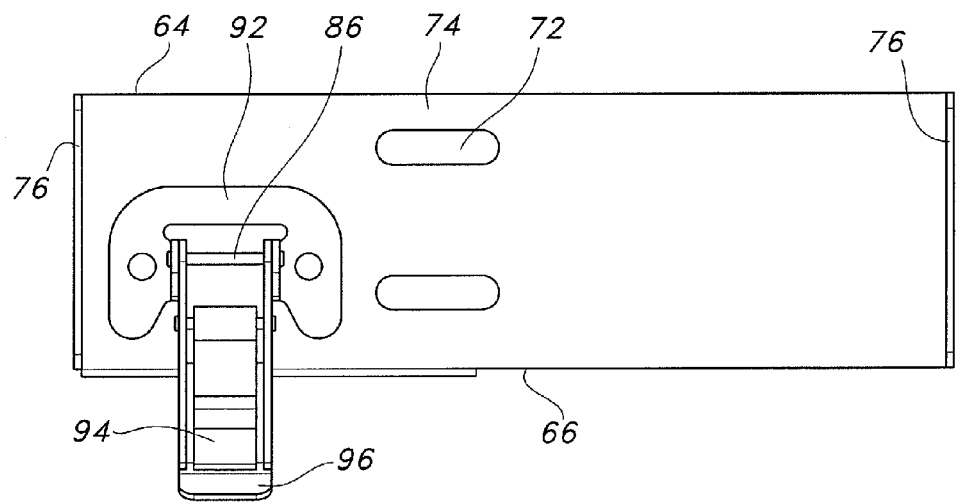
FIGS. 17 and 18 are top plan views of the quick-connect of FIG. 14.

FIGS. 15 and 18 show the clamp mechanism 90 in the locked position where the lever 96 and the hook 94 extend in opposite directions and the hook 94 is in contact and secured against the frame structure 28. FIG. 17 shows clamp mechanism 90 in an unlocked position where the hook 94 is extended outward in the same direction as the lever 96, the lever 96 is pivoted over such that the top surface is facing upwardly, and the bottom surface is against the hook 94. Also the hook 94 is disengaged from the frame structure 28. Pivoting the lever 96 extends the hook outwardly away from the base frame 92 or inwardly toward the base frame 92 for engagement and locking to the frame structure 28.

FIG. 18 shows the clamp mechanism 90 in the locked position and securing two frame structures 28 together. FIG. 15 shows the clamp mechanism 90 in the locked position and securing two frame structures 28 together in addition to securing the frame structures 28 to an external support structure.

The frame structure 28 and clamp mechanism 90 is used to form panels as a temporary wall as above discussed. In addition, the frame structure 28 and clamp mechanism 90 can be used to incorporate various features into the panel assembly 10, such as doors, windows, built in wall units and the like. For example, access doors may be added into a panel and are flush mounted, as shown in FIG. 13. The framing of the various features are attached to the frame structure 28 and the frame structure 28 is attached to the panel assembly 10 in the same manner as above described, using the clamp mechanism to secure the frame structures together.

Figure 19:
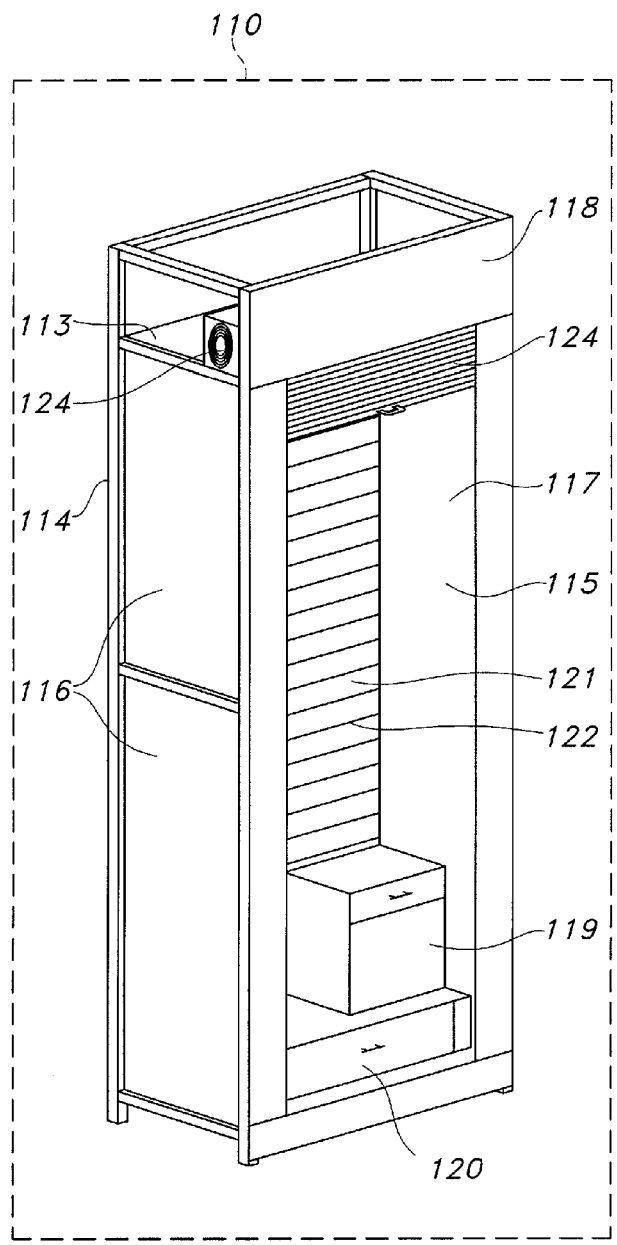
FIGS. 19-24 are views of the insertable wall shop of the present invention.
Figure 20:
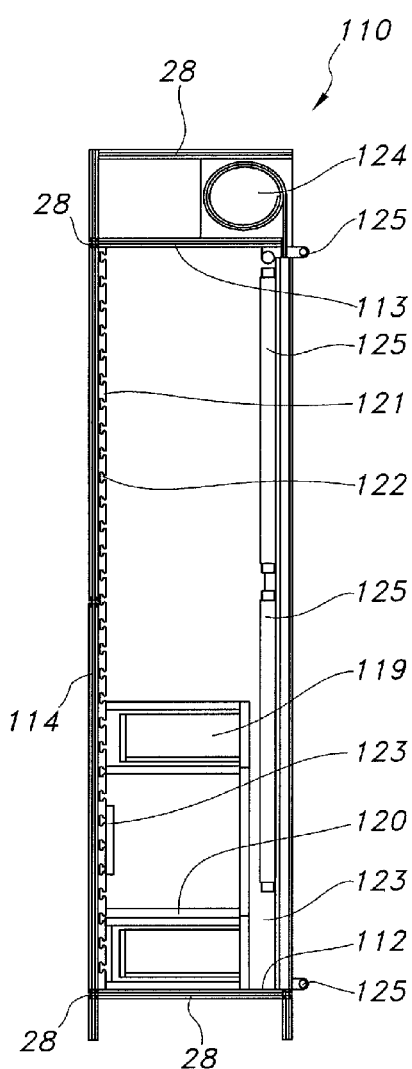
Figures 21, 22:
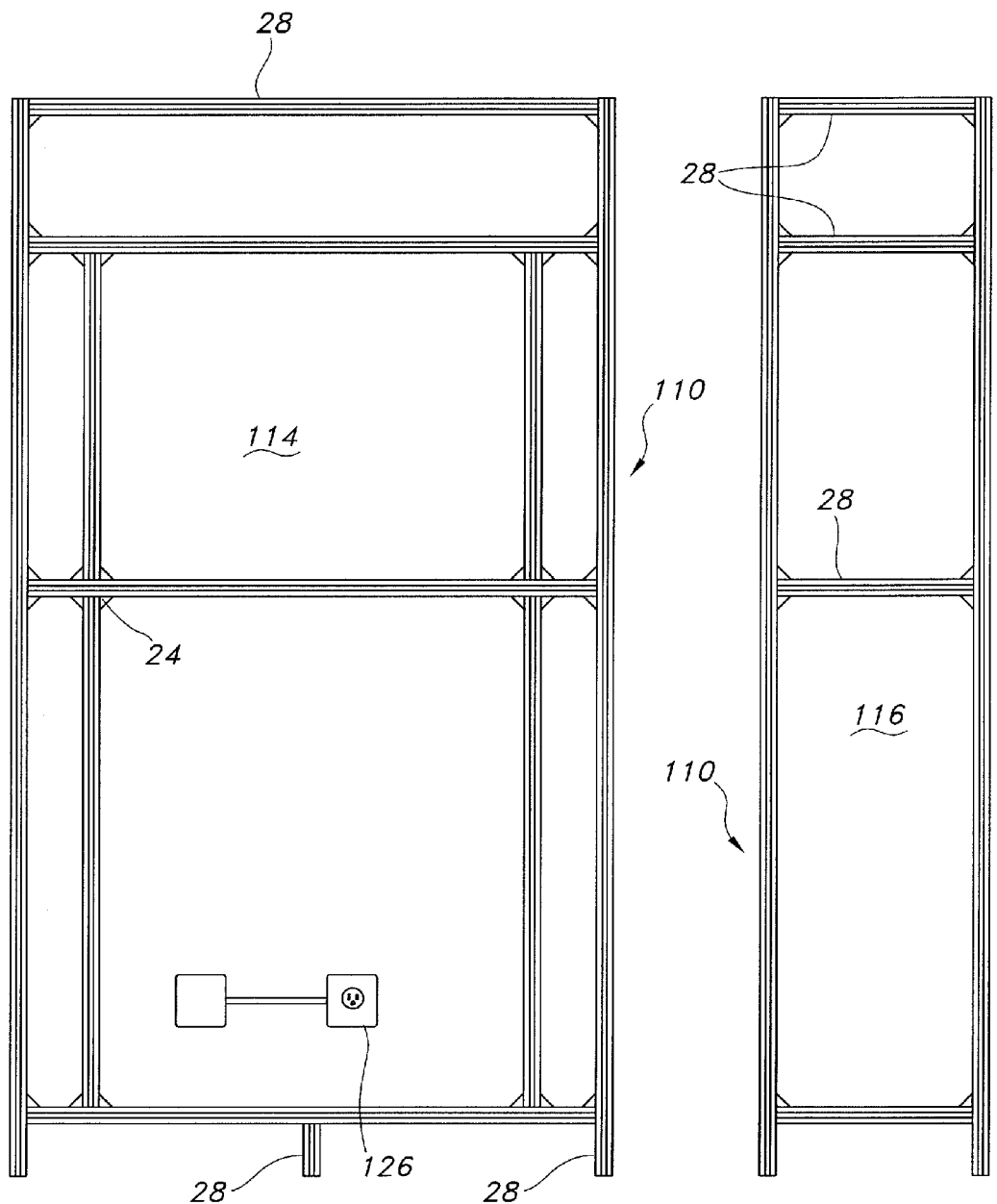

FIGS. 19-24 show an insertable wall shop 110 using frame structure 28. The wall shop 110 has a generally rectangular box shape free standing unit with a bottom wall 112, a top wall 113, a back wall 114 and two opposed sidewalls 115, 116 extending therebetween and an open front 117. The open front 117 is defined by the top wall 113, bottom wall 112 and two opposing sidewalls 115, 116. Surrounding the open front 117 is a front planar panel 118. FIG. 20 shows the frame structure 28 attached to the bottom wall 112, the top wall 113, the back side wall 114 and the opposed sidewalls 115, 116 to provide structural support for the walls. The frame structure 28 of the wall shop 110 includes vertical extents and horizontal extents to provide further support across the walls.

Figure 23:
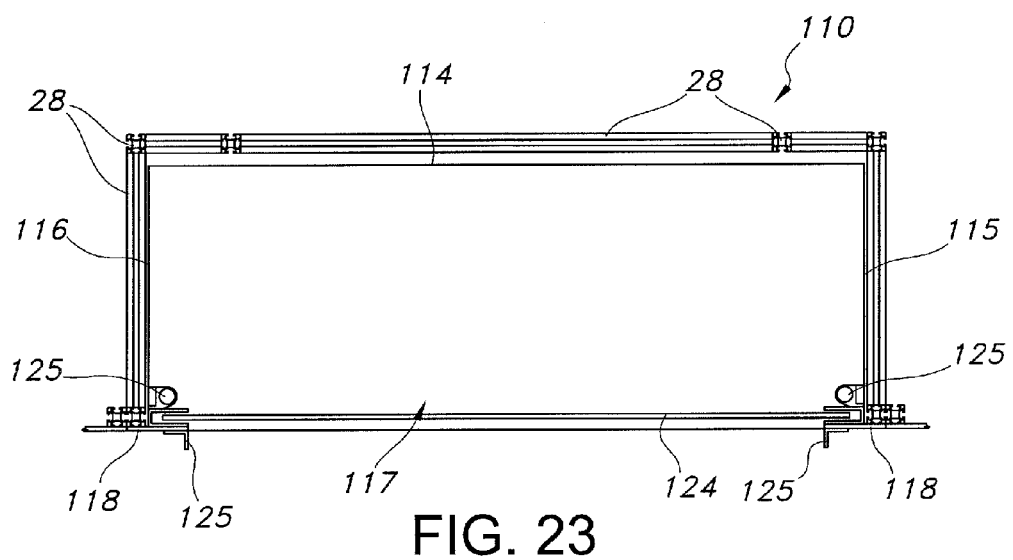
Figure 24:
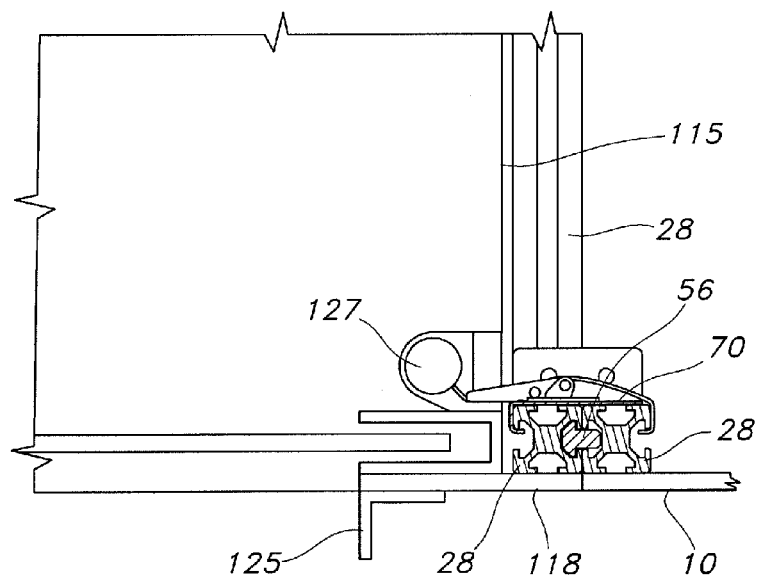

The frame structure 28 is also attached to the front planar frame 118 about the open front 117 to create an almost seamless juncture when attached to the panel assembly 10. The wall shop 110 is attached to the frames structure 28 of the panel assembly 10 on either side of the wall shop 110 to provide an insertable wall shop 110 where the front planar panel 118 is flush with the panel assembly 10 as shown in FIGS. 23 and 24. The frame structure 28 of the wall shop 110 is attached to the panel assembly 10 in the same manner as opposing panel assemblies 10 are attached together using a second connector member 56 of FIGS. 9 and 10 in conjunction with a quick-connect member 70 of FIGS. 15-17, as above-discussed.

The wall shop 110 may include various components attached and inserted within such as a cabinet 119 and a drawer 120. Additionally, the back wall 114 includes a slat wall panel 121 with horizontal Z-channels 122 formed to allow for attachment of racks, hooks, shelving and cabinet 119 using a hook 123, as shown in FIGS. 19 and 20. The wall shop 110 also includes lighting 125, a receptacle 126 which is powered through the back wall 114, and/or an overhead coiling door 124 which is concealed by the front planar panel 118, as shown in FIGS. 19, 20, 23 and 24. The coiling door 124 is used to enclose the wall shop 110 and cover the front open wall 117. The coiling door 124 uncoils and recoils along a track as shown in FIGS. 19, 23 and 24. L-shaped lockable clasps 125 are located in the door and the base of the wall shop 110 as shown in FIGS. 20, 23 and 24. The L-shaped lockable clasps 125 are used to secure the coiled door 124 to the front planar panel 118 at the base of the wall shop 110 in a closed position.

While various embodiments of the present invention are specifically illustrated and/or described herein, it will be appreciated that modifications and variations of the present invention may be effected by those skilled in the art without departing from the spirit and intended scope of the invention. Further, any of the embodiments or aspects of the invention as described in the claims or in the specification may be used with one and another without limitation.

The invention claimed is:

1. A wall assembly comprising:
   a first panel having a frame structure that includes a first frame member, the first frame member including a first exterior plane and a first recessed channel that extend along the first frame member between a first end and a second end, the first exterior plane having a first opening into the first recessed channel along the first frame member, the first opening dimensioned smaller than the recessed channel;
   a second panel having a frame structure that includes a second frame member, the second frame member including a second exterior plane and a second recessed channel that extend along the second frame member, the second exterior plane having a second opening into the second recessed channel along the second frame member, the second exterior plane disposed adjacently to the first exterior plane forming a joint between the first panel and the second panel;
   a connector including a head and a neck that terminates the connector, the head dimensioned larger than the first opening to slideably engage the first recessed channel of the first frame member from the first end or the second end such that the head is retained in the first recessed channel between the first end and the second end of first frame member, the neck extending from the head through the first opening to the outside of the first recessed channel and across the joint, the neck capable of transverse insertion into the second recessed channel through the second opening transversely to the second exterior plane of the second frame member; and
   a clasp assembly configured to removably join together the first frame member and the second frame member, wherein the clasp assembly comprises:
      a U-shaped plate including a planar plate and an L-shaped plate, the planar plate having a length and configured to be disposed partially along a third plane of the first frame member and partially along a fourth plane of the second frame member, the L-shaped plate intersecting the planar plate along at least a portion of the length and extending away from the planar plate in a first direction, the L-shaped plate dimensioned to engage the first frame member; and
      a clamp including a base plate, a lever portion and an elongated hook portion, the base plate secured to the planar plate and including extensions that intersect the base plate, the lever portion pivotally coupled to the extensions of the base plate, the elongated hook portion pivotally coupled to the lever portion and dimensioned to engage the second frame member when the lever portion is in a first non-tensioned position with respect to the hook portion, the lever portion configured to lock the hook portion to the engaged second frame member when the lever portion is in a second tensioned position with respect to the hook portion.

2. The wall assembly of claim 1, further comprising:
   a first planar sheet secured at least to the first frame member; and
   a second planar sheet secured at least to the second frame member.

3. The wall assembly of claim 1, wherein the planar plate comprises:
   a first elongated opening through the planar plate along a third recessed channel extending along the first frame member; and
   a second elongated opening through the planar plate along a fourth recessed channel extending along the second frame member.

4. The wall assembly of claim 3, further comprising:
   a first fastener extending through the first elongated opening and configured to secure the planar plate to the first frame member; and
   a second fastener extending through the second elongated opening and configured to secure the planar plate to the second frame member.

5. The wall assembly of claim 4, wherein at least one of the first fastener and the second fastener is a t-bolt fastener.

6. The wall assembly of claim 1, wherein the U-shaped plate further includes a pair of endplates that intersect the planar plate at terminal ends of the planar plate and that extend away from the planar plate in a second direction opposite to the first direction.

7. The wall assembly of claim 6, wherein each of the endplates includes at least one opening configured to one of: anchor the clasp assembly to a structure; and secure a wall element to the clasp assembly.

8. The wall assembly of claim 7, wherein the wall element is one of a door, window and wall shop.

9. The wall assembly of claim 6, wherein the structure is one of a floor, ceiling and another structure.

10. The wall assembly of claim 1,
    wherein at least one of the first recessed channel and the second recessed channel is defined at least by a base and a pair of sides that extend at a first obtuse angle from the base; and
    wherein the head of the connector is defined at least by a top and a pair of sides that extend at a second obtuse angle from the top, the second obtuse angle approximately equal to the first obtuse angle.

11. A wall assembly comprising:
    a first panel having a frame structure that includes a first frame member, the first frame member including a first exterior plane and a first recessed channel that extend along the first frame member;
    a second panel having a frame structure that includes a second frame member, the second frame member including a second exterior plane and a second recessed channel that extend along the second frame member, the second frame member disposed adjacently to the first frame member such that the first exterior plane and the second exterior plane are generally coplanar and form a joint between the first panel and the second panel; and a connector including a head, neck, and tail, the head dimensioned to slideably engage the first recessed channel such that the head is retained in the first recessed channel, the neck attaching the head to the tail, the tail including a first portion and a second portion, the first portion extending from the neck to a first side of the head and disposed partially along the first exterior plane, the second portion extending from the neck to an opposing second side of the head across the joint between the first panel and the second panel and disposed along the first exterior plane and the second exterior plane.

12. The wall assembly of claim 11, wherein the first panel includes a first planar sheet secured at least to the connector.

13. The wall assembly of claim 11, further comprising a second connector including a second head, second neck and second tail, the second head dimensioned to slideably engage the second recessed channel such that the second head is retained in the second recessed channel, the second neck attaching the second head to the second tail that is disposed along the second exterior plane.

14. The wall assembly of claim 13, wherein the second panel comprises a second planar sheet secured at least to the second connector such that a channel is formed between the second frame member and the second planar sheet, the channel extending along the second exterior plane to the second tail of the second connector.

15. The wall assembly of claim 14, wherein the tail of the first connector is received into the channel of the second panel.

16. The wall assembly of claim 11, further comprising a clasp assembly configured to removably join together the first frame member and the second frame member, wherein the clasp assembly comprises:

a U-shaped plate including a planar plate and an L-shaped plate, the planar plate having a length and configured to be disposed partially along a third plane of the first frame member and partially along a fourth plane of the second frame member, the L-shaped plate intersecting the planar plate along at least a portion of the length and extending away from the planar plate in a first direction, the L-shaped plate dimensioned to engage the first frame member; and a clamp including a base plate, a lever portion and an elongated hook portion, the base plate being secured to the planar plate and including extensions that intersect the base plate, the lever portion pivotally coupled to the extensions of the base plate, the elongated hook portion pivotally coupled to the lever portion and dimensioned to engage the second frame member when the lever portion is in a first non-tensioned position with respect to the hook portion, the lever portion configured to lock the hook portion to the engaged second frame member when the lever portion is in a second tensioned position with respect to the hook portion.

17. The wall assembly of claim 16, wherein the planar plate comprises:

a first elongated opening through the planar plate along a third recessed channel extending along the first frame member; and a second elongated opening through the planar plate along a fourth recessed channel extending along the second frame member.

18. The wall assembly of claim 17, further comprising:

a first fastener extending through the first elongated opening and configured to secure the planar plate to the first frame member; and a second fastener extending through the second elongated opening and configured to secure the planar plate to the second frame member.

19. The wall assembly of claim 18, wherein at least one of the first fastener and the second fastener is a t-bolt fastener.

20. The wall assembly of claim 19, wherein each of the endplates comprises at least one opening configured to one of: anchor the clasp assembly to a structure; and secure a wall element to the clasp assembly.

21. The wall assembly of claim 20, wherein the wall element is one of a door, window and wall shop.

22. The wall assembly of claim 16, wherein U-shaped plate further includes a pair of endplates that intersect the planar plate at terminal ends of the planar plate and that extend away from the planar plate in a second direction opposite to the first direction.

23. The wall assembly of claim 22, wherein the structure is one of a floor, ceiling and another structure.

24. The wall assembly of claim 11, wherein at least one of the first recessed channel and the second recessed channel is defined at least by a base and a pair of sides that extend at a first obtuse angle from the base; and wherein the head of the connector is defined at least by a top and a pair of sides that extend at a second obtuse angle from the top, the second obtuse angle approximately equal to the first obtuse angle.

* * * * *

UNITED STATES PATENT AND TRADEMARK OFFICE
CERTIFICATE OF CORRECTION

Page 1 of 1

PATENT NO. : 9,739,055 B2
APPLICATION NO. : 14/558157
DATED : August 22, 2017
INVENTOR(S) : Michael DeZaio It is certified that error appears in the above-identified patent and that said Letters Patent is hereby corrected as shown below:

In the Specification

Column 4, Line 62:
Now reads: "back surface (200."
Should read: -- back surface (20f) --

Column 7, Line 61:
Now reads: "and though holes"
Should read: -- and through holes --

Signed and Sealed this
Twentieth Day of February, 2018

Andrei Iancu
*Director of the United States Patent and Trademark Office*